United States Patent
Maeda et al.

(10) Patent No.: US 6,998,071 B2
(45) Date of Patent: Feb. 14, 2006

(54) COBALT OXIDE PARTICLES AND PROCESS FOR PRODUCING THE SAME, CATHODE ACTIVE MATERIAL FOR NON-AQUEOUS ELECTROLYTE SECONDARY CELL AND PROCESS FOR PRODUCING THE SAME, AND NON-AQUEOUS ELECTROLYTE SECONDARY CELL

(75) Inventors: Hideaki Maeda, Onoda (JP); Shoichi Fujino, Onoda (JP); Hiroyasu Watanabe, Ube (JP); Norimiki Sugiyama, Sakata (JP); Hideaki Sadamura, Onoda (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 664 days.

(21) Appl. No.: 10/210,178

(22) Filed: Aug. 2, 2002

(65) Prior Publication Data

US 2003/0049534 A1 Mar. 13, 2003

(30) Foreign Application Priority Data

Aug. 3, 2001 (JP) .......................................... 2001-236891
May 29, 2002 (JP) .......................................... 2002-156223

(51) Int. Cl.
*H01B 1/08* (2006.01)
*C01D 1/02* (2006.01)
*C01F 5/00* (2006.01)
*H01M 4/52* (2006.01)

(52) U.S. Cl. ................................ 252/521.2; 423/594.6; 429/218.1

(58) Field of Classification Search ............... 252/521.2; 423/594.6; 429/218.1
See application file for complete search history.

(56) References Cited

U.S. PATENT DOCUMENTS

| | | | |
|---|---|---|---|
| 4,369,105 A | 1/1983 | Caldwell et al. | |
| 6,805,996 B1 * | 10/2004 | Hosoya | 429/94 |
| 2003/0134200 A1 * | 7/2003 | Tanaka et al. | 429/231.1 |
| 2004/0096742 A1 * | 5/2004 | Akashi et al. | 429/223 |

OTHER PUBLICATIONS

Chellam et al Chem. Mater., vol. 12, 2000, pp 650–658 XP002222442 Low Temperature Synthesis of $Mg_xCo_{1-x}Co_2O_4$ Spinel Catalysts for $N_2O$ Decomposition.

Kezhov et al Acta Physica Hungarica (1994), 75(1–4), 243–6 XP009001765 Neutral diffraction investigation of the cationic distributions in $Mg_xCo_{3-x}O_4$ (Me=Cu, MG, Zn Spinels.

Kerzhof et al J. of Physics: Condensed Matter (1992), 4(42), L543–L548, XP002222443 On the cationic distribution in $Mg_xCo_{3-x}O_4$ spinels.

Database WPI Section CH, Week 200134 Derwent AN 2001-321400 XP002222445.

* cited by examiner

*Primary Examiner*—Mark Kopec
(74) *Attorney, Agent, or Firm*—Nixon & Vanderhye P.C.

(57) ABSTRACT

The present invention relates to cobalt oxide particles useful as a precursor of a cathode active material for a non-aqueous electrolyte secondary cell which is capable of showing a stable crystal structure by insertion reaction therein, and producing a non-aqueous electrolyte secondary cell having a high safety and especially a high heat stability, a process for producing the cobalt oxide particles, a cathode active material for a non-aqueous electrolyte secondary cell using the cobalt oxide particles, a process for producing the cathode active material, and a non-aqueous electrolyte secondary cell using the cathode active material.

10 Claims, 3 Drawing Sheets

COBALT OXIDE PARTICLES AND PROCESS FOR PRODUCING THE SAME, CATHODE ACTIVE MATERIAL FOR NON-AQUEOUS ELECTROLYTE SECONDARY CELL AND PROCESS FOR PRODUCING THE SAME, AND NON-AQUEOUS ELECTROLYTE SECONDARY CELL

BACKGROUND OF THE INVENTION

The present invention relates to cobalt oxide particles, a process for producing the cobalt oxide particles, a cathode active material for a non-aqueous electrolyte secondary cell, a process for producing the cathode active material, and a non-aqueous electrolyte secondary cell. More particularly, the present invention relates to cobalt oxide particles useful as a precursor of a cathode active material for a non-aqueous electrolyte secondary cell which is capable of showing a stable crystal structure by insertion reaction therein, and producing a non-aqueous electrolyte secondary cell having a high safety and especially a high heat stability, a process for producing the cobalt oxide particles, a cathode active material for a non-aqueous electrolyte secondary cell using the cobalt oxide particles, a process for producing the cathode active material, and a non-aqueous electrolyte secondary cell using the cathode active material.

With the recent rapid development of portable and cordless electronic devices such as audio-visual (AV) devices and personal computers, there has been an increasingly demand for providing as a power source thereof, a secondary cell (lithium battery) having a small size, a light weight and a high energy density. Under this circumstance, lithium ion secondary cells have been especially noticed because of advantages such as high charge/discharge voltage as well as large charge/discharge capacity.

Hitherto, as cathode active materials useful for high energy-type lithium ion secondary cells having a 4V-grade voltage, there are generally known $LiMn_2O_4$ which has a spinel structure, $LiMnO_2$ which has a corrugated layer structure, $LiCoO_2$, $LiCo_{1-x}Ni_xO_2$ and $LiNiO_2$ which have a rock-salt layer structure, or the like. Among the secondary cells using these active materials, lithium ion secondary cells using $LiCoO_2$ are more excellent because of high charge/discharge voltage and large charge/discharge capacity thereof. These lithium ion secondary cells have been required to show more excellent properties.

Specifically, when lithium ions are released from $LiCoO_2$, the crystal structure of $LiCoO_2$ undergoes Jahn-Teller distortion since $Co^{3+}$ is converted into $Co^{4+}$. When the amount of lithium ions released reaches 0.45, the crystal structure of $LiCoO_2$ is transformed from hexagonal system into monoclinic system, and a further release of lithium ions causes the transformation of the crystal structure from monoclinic system into hexagonal system. Therefore, by repeating the charge/discharge reaction, the crystal structure of $LiCoO_2$ tends to become unstable, resulting in release of oxygen from $LiCoO_2$ and undesired reaction between $LiCoO_2$ and an electrolyte solution.

Further, the reaction between $LiCoO_2$ and the electrolyte solution is more active under higher temperature conditions. Therefore, in order to ensure safety of the secondary cell, it has been required to provide cathode active materials exhibiting a stable structure, namely a high heat stability even under high temperature conditions.

For these reasons, it has been required to provide lithium cobaltate ($LiCoO_2$) exhibiting a stable crystal structure even when lithium is released therefrom.

Hitherto, in order to stabilize a crystal structure of lithium cobaltate and improve various properties thereof such as charge/discharge cycle characteristics, there are known a method of incorporating magnesium into lithium cobaltate particles (Japanese Patent No. 2797693 and Japanese Patent Application Laid-Open (KOKAI) Nos. 5-54889(1993), 6-168722(1994), 7-226201(1995), 11-102704(1999), 2000-12022, 2000-11993 and 2000-123834); a method of mixing magnesium with lithium cobaltate particles by a hydrothermal synthesis method (Japanese Patent Application Laid-Open (KOKAI) No. 10-1316(1998)); a method of controlling a lattice constant of lithium cobaltate to improve properties thereof (Japanese Patent Application Laid-Open (KOKAI) No. 6-181062(1994)); or the like.

In addition, in order to obtain lithium cobaltate particles satisfying the above properties, cobalt oxide particles as a precursor thereof are also required to show an excellent reactivity. As the method for producing cobalt oxide particles having an excellent reactivity, there has been proposed a method of obtaining fine cobalt oxide particles by a wet reaction method (Japanese Patent Application Laid-Open (KOKAI) Nos. 10-324523(1998) and 2002-68750).

At present, it has been strongly required to provide cathode active materials satisfying the above requirements and cobalt oxide particles as a precursor thereof. However, such cathode active materials and cobalt oxide particles have not been obtained until now.

That is, in Japanese Patent No. 2797693 and Japanese Patent Application Laid-Open (KOKAI) Nos. 5-54889 (1993), 6-168722(1994), 7-226201(1995), 11-102704 (1999), 2000-12022, 2000-11993 and 2000-123834, there is described the method of obtaining lithium cobaltate particles containing magnesium by dry-mixing a cobalt compound, a lithium compound and a magnesium compound. However, in this method, since the obtained lithium cobaltate particles show a non-uniform distribution of magnesium within the particle, the crystal structure thereof tends to undergo destruction upon the release and insertion reactions of lithium ions. As a result, the lithium cobaltate particles fail to show an excellent heat stability.

In Japanese Patent Application Laid-Open (KOKAI) No. 10-1316(1998), there is described the method for producing lithium cobaltate particles by dispersing a cobalt compound and a magnesium compound in an aqueous lithium hydroxide solution and heat-treating the resultant dispersion. However, this method requires to conduct the hydrothermal treatment, and the obtained lithium cobaltate particles fail to show a small particle size and excellent particle properties.

Also, in Japanese Patent Application Laid-Open (KOKAI) No. 6-181062(1994), there is described lithium cobaltate having a c-axis length of lattice constant of not less than 14.05 Å. However, the obtained lithium cobaltate cannot be sufficiently improved in heat stability as compared to those containing magnesium and, therefore, fails to show an excellent heat stability.

Further, in Japanese Patent Application Laid-Open (KOKAI) Nos. 10-324523(1998) and 2002-68750, there is described the method for producing fine cobalt oxide particles by a wet reaction method. However, since no magnesium is contained in the obtained cobalt oxide particles, a cathode active material composed of lithium cobaltate particles produced from such cobalt oxide particles fails to show a sufficient heat stability.

As a result of the present inventors' earnest studies for solving the above problems, it has been found that by mixing a lithium compound with cobalt oxide particles containing magnesium therein which have a composition represented by the formula: $(Co_{(1-x)}Mg_x)_3O_4$ ($0.001 \leq x < 0.15$), and have a BET specific surface area value of 0.5 to 50 m²/g and an average particle diameter of not more than 0.2 μm, or cobalt oxide particles surface-coated with magnesium hydroxide which have a composition represented by the formula: $(1-x)Co_3O_4 \cdot 3xMg(OH)_2$ ($0.001 \leq x < 0.15$), and have a BET specific surface area value of 0.5 to 50 m²/g and an average particle diameter of not more than 0.2 μm; and heat-treating the resultant mixture, the obtained cathode active material has not only a more stable crystal structure but also a more excellent heat stability, and is useful as a cathode active material for a non-aqueous electrolyte secondary cell. The present invention has been attained based on the above finding.

SUMMARY OF THE INVENTION

An object of the present invention is to provide cobalt oxide particles useful as a precursor of a cathode active material having not only a more stable crystal structure but also a more excellent heat stability, and a process for producing the cobalt oxide particles.

Another object of the present invention is to provide a cathode active material for a non-aqueous electrolyte secondary cell which has not only a more stable crystal structure but also a more excellent heat stability, and a process for producing the cathode active material.

A further object of the present invention is to provide a non-aqueous secondary cell not only maintaining an excellent initial discharge capacity required for secondary cells, but also having an improved heat stability.

In order to accomplish the aims, in a first aspect of the present invention, there are provided cobalt oxide particles having a composition represented by the formula:

$(Co_{(1-x)}Mg_x)_3O_4$ wherein x is 0.001 to 0.15, and
having a BET specific surface area value of 0.5 to 50 m²/g and an average particle diameter of not more than 0.2 μm.

In a second aspect of the present invention, there are provided cobalt oxide particles surface-coated with magnesium hydroxide, having a composition represented by the formula:

$(1-x)CO_3O_4 \cdot 3xMg(OH)_2$ wherein x is 0.001 to 0.15, and
having a BET specific surface area value of 0.5 to 50 m²/g and an average particle diameter of not more than 0.2 μm.

In a third aspect of the present invention, there are provided cobalt oxide particles having a composition represented by the formula:

$(Co_{(1-x)}Mg_x)_3O_4 \cdot 3yAl(OH)_3$ wherein x is 0.001 to 0.15 and y is 0.001 to 0.05, and
having a BET specific surface area value of 0.5 to 50 m²/g and an average particle diameter of not more than 0.2 μm.

In a fourth aspect of the present invention, there is provided a cathode active material for a non-aqueous electrolyte secondary cell, having a composition represented by the formula:

$LiCo_{(1-x)}Mg_xO_2$ wherein x is 0.001 to 0.15,
having an average particle diameter of 1.0 to 20 μm, and
having an a-axis length of lattice constant of from 0.090x+2.816 Å to 0.096x+2.821 Å and a c-axis length of lattice constant of 0.460x+14.053 Å to 0.476x+14.063 Å wherein x has the same meaning as defined above.

In a fifth aspect of the present invention, there is provided a cathode active material for a non-aqueous electrolyte secondary cell, having a composition represented by the formula:

$Li(Co_{(1-x-y)}Mg_xAl_y)O_2$, wherein x is 0.001 to 0.15 and y is 0.001 to 0.05
having an average particle diameter of 1.0 to 20 μm, and
having an a-axis length of lattice constant of from 0.090x+2.816 Å to 0.096x+2.821 Å and a c-axis length of lattice constant of 0.460x+14.053 Å to 0.476x+14.063 Å wherein x has the same meaning as defined above.

In a sixth aspect of the present invention, there is provided a cathode active material for a non-aqueous electrolyte secondary cell, having a composition represented by the formula:

$LiCo_{(1-x)}Mg_xO_2$ wherein x is 0.001 to 0.15,
having an average particle diameter of 1.0 to 20 μm, a BET specific surface area value of 0.1 to 1.6 m²/g, a volume resistivity value of $1.0 \times 10$ to $1.0 \times 10^6$ Ω·cm, an electron conductivity (log (1/Ωcm)) of −0.5 to −5.0 and a crystallite size of 400 to 1,200 Å, and
having an a-axis length of lattice constant of from 0.090x+2.816 Å to 0.096x+2.821 Å and a c-axis length of lattice constant of 0.460x+14.053 Å to 0.476x+14.063 Å wherein x has the same meaning as defined above.

In a seventh aspect of the present invention, there is provided a non-aqueous electrolyte secondary cell having a cathode comprising the cathode active material defined in the third aspect or fourth aspect.

In an eighth aspect of the present invention, there is provided a process for producing the cobalt oxide particles defined in the first aspect, comprising:
neutralizing a solution containing a cobalt salt and a magnesium salt with an aqueous alkali solution; and
then subjecting the resultant mixture to oxidation reaction to obtain magnesium-containing cobalt oxide particles.

In a ninth aspect of the present invention, there is provided a process for producing the cobalt oxide particles defined in the second aspect, comprising:
neutralizing a solution containing a cobalt salt with an aqueous alkali solution;
subjecting the resultant mixture to oxidation reaction to obtain a water suspension containing cobalt oxide particles;
adding a magnesium salt to the water suspension containing the cobalt oxide particles; and
adjusting a pH value of the water suspension to coat a surface of each cobalt oxide particle with magnesium hydroxide.

In a tenth aspect of the present invention, there is provided a process for producing the cathode active material for a non-aqueous electrode secondary cell defined in the third aspect, comprising:
mixing the cobalt oxide particles defined in the first or second aspect with a lithium compound; and
heat-treating the resultant mixture.

DETAILED DESCRIPTION OF THE INVENTION

Figure 1:
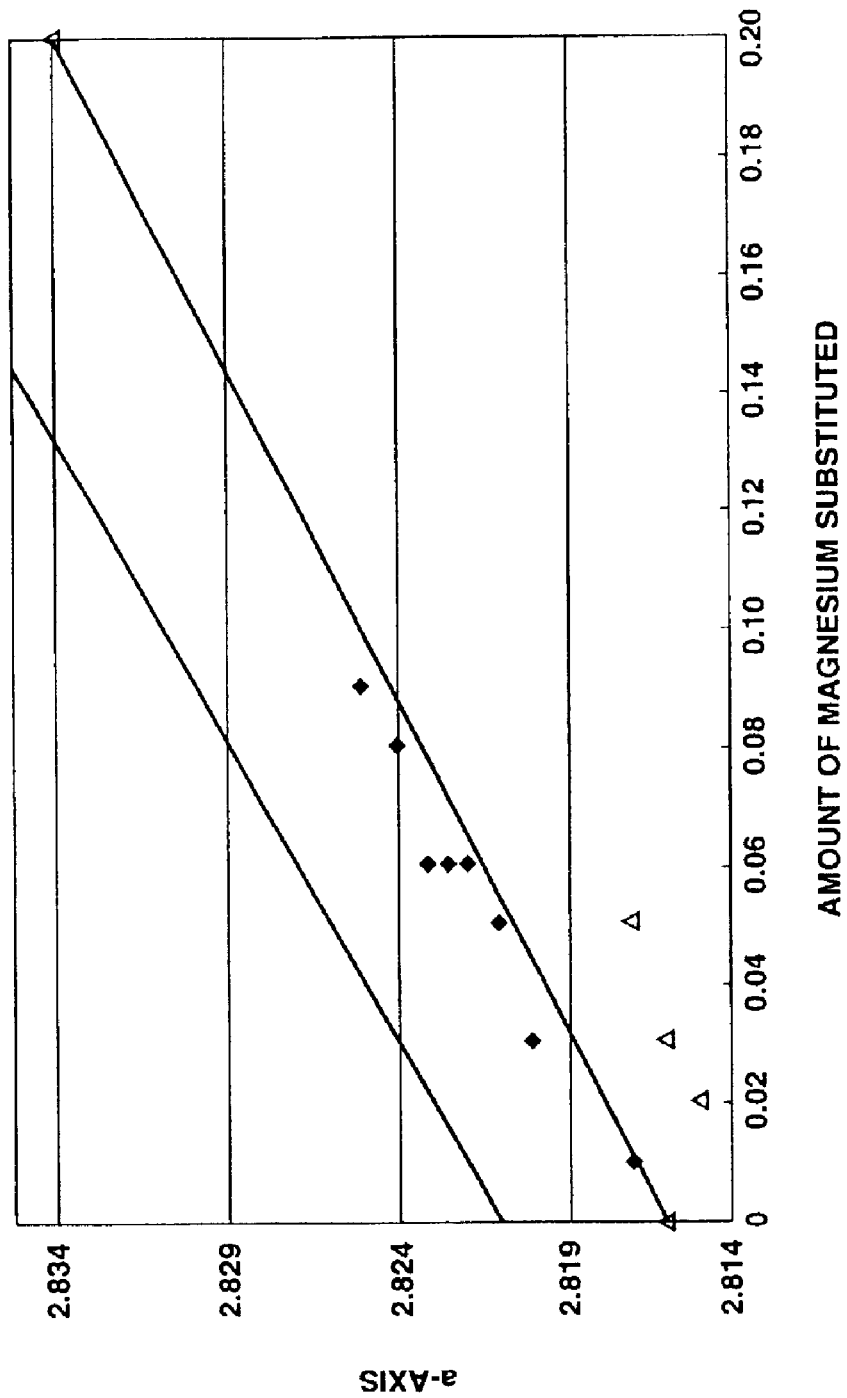
FIG. 1 is a graph showing the relationship between the amount of magnesium substituted for each of the cathode active materials obtained in Examples 2 and 10 to 16 and Comparative Examples 3 to 6, and the a-axis length of lattice constant of the cathode active material, wherein ♦ indicates plots for the Examples, and Δ indicates plots for the Comparative Examples (there is a plot of the same value).
Figure 2:
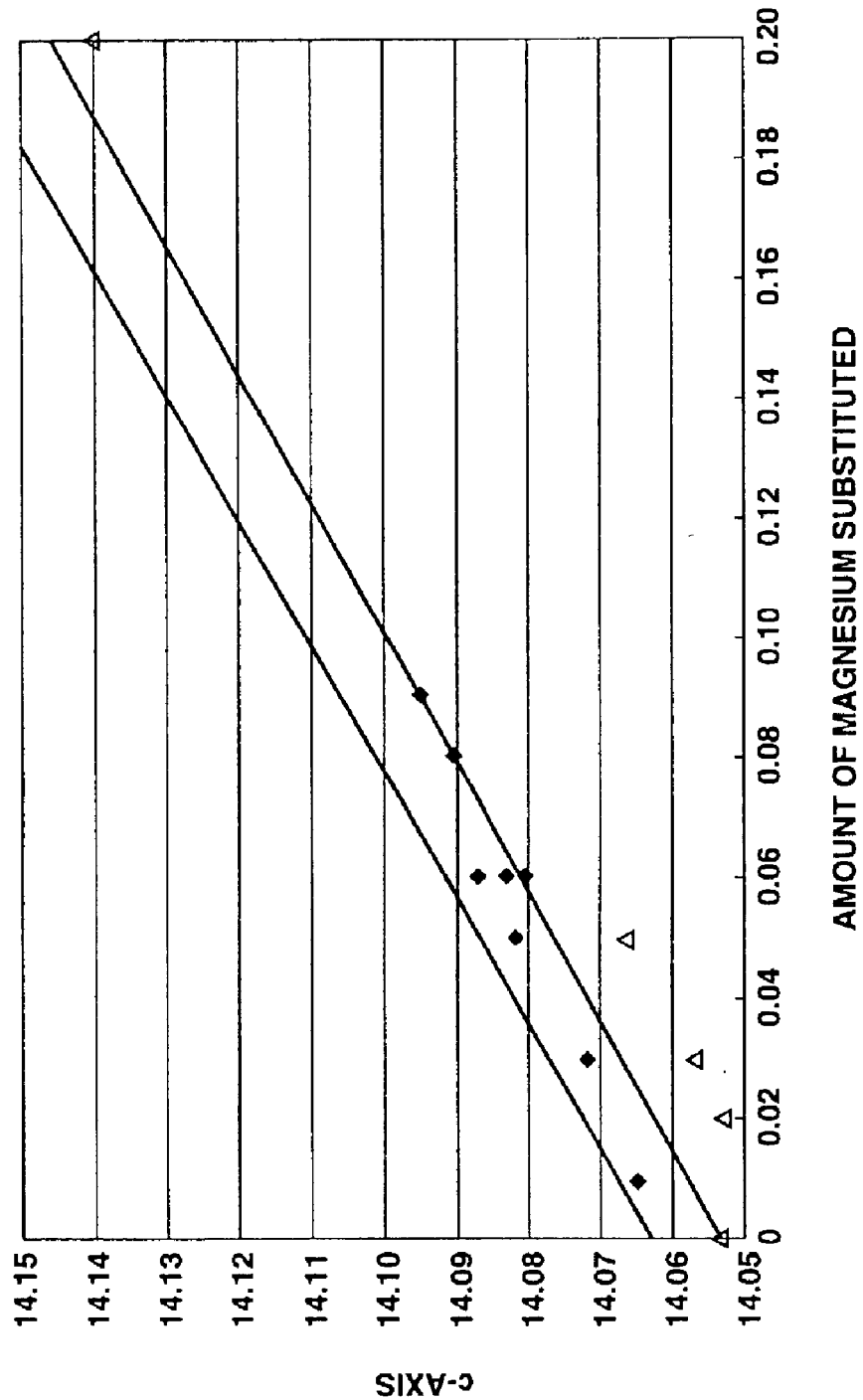
FIG. 2 is a graph showing the relationship between the amount of magnesium substituted for each of the cathode active materials obtained in Examples 2 and 10 to 16 and Comparative Examples 3 to 6, and the c-axis length of lattice constant of the cathode active material, wherein ♦ indicates plots for the Examples, and Δ indicates plots for the Comparative Example (there is a plot of the same value).
Figure 3:
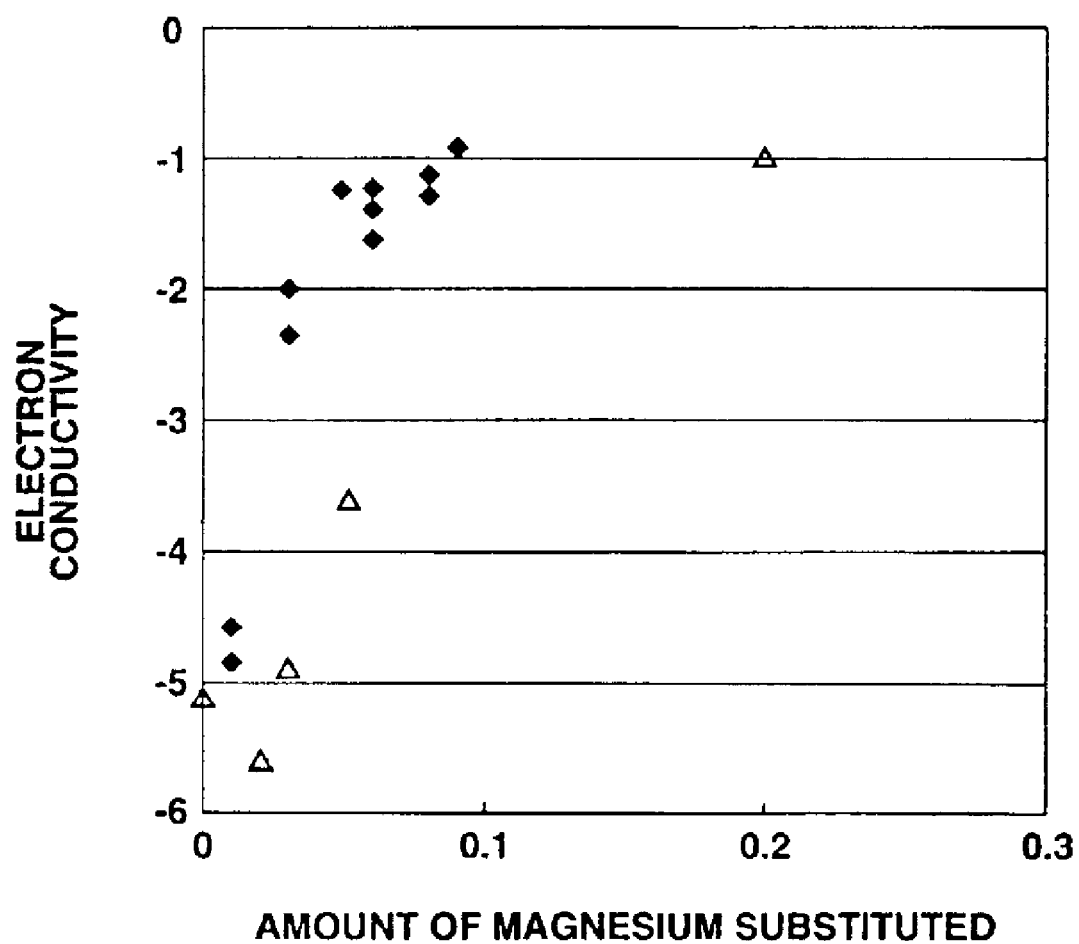
FIG. 3 is a graph showing the relationship between the amount of magnesium substituted for each of the cathode active materials obtained in Examples 2, 10 to 16, 18 and 22 to 24 and Comparative Examples 3 to 6 and 8, and the electron conductivity of the cathode active material, wherein ♦ indicates plots for the Examples, and Δ indicates plots for the Comparative Examples (there are plots of the same value).

The present invention is described in detail below.

First, the cobalt oxide particles (I) and (I') of the present invention are described.

The cobalt oxide particles (I) of the present invention are cobalt oxide particles containing magnesium, and have a composition represented by the formula:

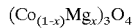

$(Co_{(1-x)}Mg_x)_3O_4$ wherein x is 0.001 to 0.15.

When the magnesium content x of the cobalt oxide particles is less than 0.001, the cathode active material obtained by using such cobalt oxide particles may fail to show a sufficient heat stability. When the magnesium content x of the cobalt oxide particles is more than 0.15, it may be difficult to industrially produce single-phase lithium cobaltate therefrom.

The cobalt oxide particles (I') of the present invention are cobalt oxide particles containing magnesium and aluminum, and have a composition represented by the formula:

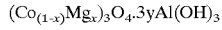

$(Co_{(1-x)}Mg_x)_3O_4 \cdot 3yAl(OH)_3$ wherein x is 0.001 to 0.15 and y is 0.001 to 0.05.

When the magnesium content x of the cobalt oxide particles is less than 0.001, the cathode active material obtained by using such cobalt oxide particles may fail to show a sufficient heat stability. When the magnesium content x of the cobalt oxide particles is more than 0.15, it may be difficult to industrially produce single-phase lithium cobaltate therefrom. When the aluminum content y of the cobalt oxide particles is less than 0.001, the cathode active material obtained by using such cobalt oxide particles may fail to show a sufficient good cycle performance. When the aluminum content y of the cobalt oxide particles is more than 0.05, it may be difficult to industrially produce single-phase lithium cobaltate therefrom.

The cobalt oxide particles (I) and (I') of the present invention have an average particle diameter of usually not more than 0.2 μm, preferably 0.01 to 0.15 μm, more preferably 0.05 to 0.12 μm. Cobalt oxide particles having an average particle diameter of more than 0.2 μm may be difficult to industrially produce.

The cobalt oxide particles (I) and (I') of the present invention have a BET specific surface area value of usually 0.5 to 50 m²/g, preferably 1.0 to 40 m²/g, more preferably 5.0 to 25 m²/g. Cobalt oxide particles having a BET specific surface area value of less than 0.5 m²/g may be difficult to industrially produce. When the BET specific surface area value is more than 50 m²/g, the obtained cobalt oxide particles may fail to show excellent particle characteristics when subjected to various processes such as mixing and heat-treatment.

Then, the cobalt oxide particles (II) of the present invention are described.

The cobalt oxide particles (II) of the present invention are cobalt oxide particles each surface-coated with magnesium hydroxide, and having a composition represented by the formula:

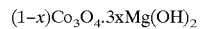

$(1-x)Co_3O_4 \cdot 3xMg(OH)_2$ wherein x is 0.001 to 0.15.

When the amount x of magnesium of the cobalt oxide particles is less than 0.001, the cathode active material obtained by using such cobalt oxide particles may fail to show a sufficient heat stability. When the amount x of magnesium of the cobalt oxide particles is more than 0.15, it may be difficult to industrially produce single-phase lithium cobaltate therefrom.

The cobalt oxide particles (II) of the present invention have an average particle diameter of usually not more than 0.2 μm, preferably 0.01 to 0.15 μm, more preferably 0.05 to 0.12 μm. Cobalt oxide particles having an average particle diameter of more than 0.2 μm may be difficult to industrially produce.

The cobalt oxide particles (II) of the present invention have a BET specific surface area value of usually 0.5 to 50 m²/g, preferably 1.0 to 40 m²/g, more preferably 5.0 to 25 m²/g. Cobalt oxide particles having a BET specific surface area value of less than 0.5 m²/g may be difficult to industrially produce. When the BET specific surface area value is more than 50 m²/g, the obtained cobalt oxide particles may fail to show excellent particle characteristics when subjected to various processes such as mixing and heat-treatment.

Next, the process for producing the cobalt oxide particles (I) is described below.

The cobalt oxide particles (I) can be produced by adding a magnesium salt to a solution containing a cobalt salt; subjecting the resultant solution to neutralization reaction by adding an aqueous alkali solution thereto; then subjecting the thus neutralized solution to oxidation reaction; and, if required, heat-treating then obtained material.

Examples of the magnesium salt may include magnesium sulfate, magnesium nitrate, magnesium phosphate, magnesium hydrogenphosphate, magnesium carbonate or the like.

Examples of the cobalt salt may include cobalt sulfate, cobalt nitrate, cobalt acetate, cobalt carbonate or the like.

Examples of the aqueous alkali solution may include aqueous solutions containing sodium hydroxide, potassium hydroxide, sodium carbonate, ammonia or the like. Among these aqueous solutions, an aqueous sodium hydroxide solution, an aqueous sodium carbonate solution and a mixed solution thereof are preferred.

The amount of magnesium added is usually 0.1 to 20 mol %, preferably 1 to 18 mol % based on cobalt.

The amount of the aqueous alkali solution used in the neutralization reaction is preferably 1.0 to 1.2 equivalents based on one equivalent of a neutralized part of whole metal salts contained in the cobalt oxide particles (I).

The oxidation reaction may be conducted by passing an oxygen-containing gas through the reaction system. The reaction temperature is preferably not less than 30° C., more preferably 30 to 95° C., and the reaction time is preferably 5 to 20 hours.

The process for producing the cobalt oxide particles (I') is described below.

The cobalt oxide particles (I') can be produced by adding an aluminum salt to a suspension containing the cobalt oxide particles (I); adjusting a pH value of the resultant solution by adding an aqueous alkali solution thereto, thereby coating the surface of the cobalt oxide particle with aluminum hydroxide; and, if required, heat-treating then obtained material.

Examples of the aluminum salt may include aluminum sulfate, aluminum nitrate, sodium aluminum or the like.

The amount of aluminum added is usually 0.1 to 5 mol %, preferably 0.1 to 3 mol % based on cobalt.

Next, the process for producing the cobalt oxide particles (II) according to the present invention is described below.

The cobalt oxide particles (II) of the present invention can be produced by subjecting a solution containing a cobalt salt to neutralization reaction by adding an aqueous alkali solution thereto; subjecting the neutralized product to oxidation reaction to obtain cobalt oxide particles; adding a magnesium salt to the reaction solution containing the cobalt oxide particles; adjusting a pH value of the resultant solution by adding an aqueous alkali solution thereto, thereby coating the surface of the cobalt oxide particle with magnesium hydroxide; and, if required, heat-treating then obtained material.

As the cobalt salt and magnesium salt, there may be used the same as described above.

As the aqueous alkali solution, there may be used the same aqueous alkali solutions as described above.

The amount of magnesium added is usually 0.1 to 20 mol %, preferably 1 to 18 mol % based on cobalt.

The amount of the aqueous alkali solution used in the neutralization reaction for obtaining the cobalt oxide particles is preferably 1.0 to 1.2 equivalents based on one equivalent of a neutralized part of the cobalt salt.

The oxidation reaction may be conducted by passing an oxygen-containing gas through the reaction system. The reaction temperature is preferably not less than 30° C., more preferably 30 to 95° C., and the reaction time is preferably 5 to 20 hours.

The amount of the aqueous alkali solution used for the surface treatment with magnesium hydroxide is preferably 1.0 to 1.2 equivalents based on one equivalent of a neutralized part of the magnesium salt.

The pH value of the reaction solution upon the surface treatment is preferably 11 to 13.

Next, the cathode active material for a non-aqueous electrolyte secondary cell (hereinafter referred to merely as "cathode active material") according to the present invention is described.

In the case where the composition of the cathode active material (III) according to the present invention is represented by the following formula:

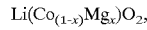

the magnesium content x is usually 0.001 to 0.15, preferably 0.01 to 0.10.

When the magnesium content x of the cathode active material is less than 0.001, the effect of improving the heat stability of the cathode active material may become insufficient. When the magnesium content x is more than 0.15, the initial discharge capacity of the cathode active material tends to be considerably deteriorated.

In the case where the composition of the cathode active material (III') according to the present invention is represented by the following formula:

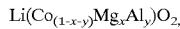

the magnesium content x is usually 0.001 to 0.15, preferably 0.01 to 0.10 and aluminum content y is usually 0.001 to 0.05, preferably 0.001 to 0.03.

When the magnesium content x of the cathode active material is less than 0.001, the effect of improving the heat stability of the cathode active material may become insufficient. When the magnesium content x is more than 0.15, the initial discharge capacity of the cathode active material tends to be considerably deteriorated. When the aluminum content y of the cobalt oxide particles of the present invention is less than 0.001, the cathode active material obtained by using such cobalt oxide particles may fail to show a sufficient good cycle performance. When the aluminum content y of the cobalt oxide particles is more than 0.05, it may be difficult to industrially produce single-phase lithium cobaltate therefrom.

The cathode active material (III) and (III') of the present invention has an average particle diameter of usually 1.0 to 20 $\mu$m, preferably 2.0 to 10 $\mu$m. When the average particle diameter of the cathode active material is less than 1.0 $\mu$m, the obtained cathode active material suffers from disadvantages such as low packing density and increased reactivity with an electrolyte solution. The cathode active material having an average particle diameter of more than 20 $\mu$m may be difficult to industrially produce.

As to the lattice constant of the cathode active material (III) and (III') of the present invention, the a-axis length thereof is usually from 0.090x+2.816 Å to 0.096x+2.821 Å, and the c-axis length thereof is usually 0.460x+14.053 Å to 0.476x+14.063 Å, wherein x has the same meaning as defined above. When the a-axis and c-axis lengths are less than the above-specified ranges, the lattice constant of the obtained lithium cobaltate particles may become small, thereby failing to attain a sufficient heat stability. When the a-axis and c-axis lengths are more than the above-specified ranges, a large amount of magnesium may be substituted for the cathode active material, resulting in deterioration in initial discharge capacity thereof.

The cathode active material (III) and (III') of the present invention has a BET specific surface area value of preferably 0.1 to 1.6 m$^2$/g, more preferably 0.3 to 1.0 m$^2$/g. The cathode active material having a BET specific surface area of less than 0.1 m$^2$/g may be difficult to industrially produce. When the BET specific surface area thereof is more than 1.6 m$^2$/g, the obtained cathode active material may tend to suffer from disadvantages such as low packing density and increased reactivity with an electrolyte solution.

The cathode active material (III) and (III') of the present invention has a volume resistivity value of preferably 1.0×10 to 1.0×10$^6$ Ω·cm, more preferably 1.0×10 to 1.0×10$^5$ Ω·cm.

The cathode active material (III) and (III') of the present invention has an electron conductivity log(Ωcm) of preferably −0.5 to −5.0, more preferably −0.5 to −4.9.

The cathode active material (III) and (III') of the present invention preferably has a crystallite size of 400 to 1,200 Å.

Next, the process for producing the cathode active material according to the present invention will be described below.

The cathode active material (III) of the present invention can be produced by mixing the cobalt oxide particles (I) or the cobalt oxide particles (II) with a lithium compound, and heat-treating the resultant mixture.

The mixing of the cobalt oxide particles (I) or the cobalt oxide particles (II) with the lithium compound may be performed by either a dry method or a wet method as long as these materials can be uniformly mixed with each other.

The mixing molar ratio of lithium to a sum of cobalt and magnesium contained in the cobalt oxide particles (I) or the cobalt oxide particles (II) is preferably 0.95 to 1.05.

The cathode active material (III') of the present invention can be produced by mixing the cobalt oxide particles (I) or the cobalt oxide particles (II) with both of a lithium compound and an aluminum compound such as aluminum hydroxide, aluminum oxide or the like, and heat-treating the resultant mixture.

The mixing of the cobalt oxide particles (I) or the cobalt oxide particles (II) with both of the lithium compound and the aluminum salt may be performed by either a dry method or a wet method as long as these materials can be uniformly mixed with each other.

The mixing molar ratio of lithium to a sum of cobalt and magnesium contained in the cobalt oxide particles (I) or the cobalt oxide particles (II) is preferably 0.95 to 1.05. The mixing molar ratio of aluminum to a sum of cobalt and magnesium contained in the cobalt oxide particles (I) or the cobalt oxide particles (II) is preferably 0.001 to 0.05.

The cathode active material (III') of the present invention can be produced by mixing the cobalt oxide particles (I') with a lithium compound, and heat-treating the resultant mixture.

The mixing of the cobalt oxide particles (I') with the lithium compound may be performed by either a dry method or a wet method as long as these materials can be uniformly mixed with each other.

The mixing molar ratio of lithium to a sum of cobalt, magnesium and aluminum contained in the cobalt oxide particles (I') is preferably 0.95 to 1.05.

The heat-treating temperature is preferably 600 to 950° C. at which $LiCoO_2$ having a high-temperature regular phase can be produced. When the heat-treating temperature is less than 600° C., $LiCoO_2$ made of a low-temperature phase having a pseudo-spinel structure is disadvantageously produced. When the heat-treating temperature is more than 950° C., $LiCoO_2$ made of a high-temperature irregular phase in which lithium and cobalt are dispersed at random positions, is disadvantageously produced. The heat-treating atmosphere is preferably an oxidative gas atmosphere, and the reaction time is preferably 5 to 20 hours.

Next, the cathode for a non-aqueous electrolyte secondary cell using the cathode active material (III) or (III') of the present invention is described.

In the case where a cathode is produced using the cathode active material of the present invention, the cathode active material is mixed with a conductive agent and a binder by an ordinary method. As the preferred conductive agent, there may be used acetylene black, carbon black, graphite or the like. As the preferred binder, there may be used polytetrafluoroethylene, polyvinylidene fluoride or the like.

A secondary cell (lithium battery) according to the present invention comprises a pair of electrodes disposed by means of a separator in the presence of a lithium ion conductive electrolyte.

A cathode and an anode are disposed in a container so as to be opposed to each other with a separator composed of a porous thermoplastic resin film. A lithium ion conductive electrolyte is present in the container.

In the secondary cell of the present invention, it is only necessary that the above-described specific cathode active material is used for at least one electrode, preferably a cathode active material, and the other active materials may be the known substances which are conventionally used for a lithium battery.

The secondary cell produced by using the cathode active material of the present invention, is constituted by the above cathode as well as an anode and an electrolyte.

As an active material for the anode, there may be used metallic lithium, lithium/aluminum alloy, lithium/tin alloy, graphite or the like.

In addition, as a solvent for the electrolyte solution, there may be used a mixed solvent of ethylene carbonate and diethyl carbonate, an organic solvent containing at least one solvent selected from the group consisting of carbonates such as propylene carbonate and dimethyl carbonate and ethers such as dimethoxyethane, and the like.

Further, as the electrolyte, there may be used a solution prepared by dissolving the above lithium phosphate hexafluoride or at least one lithium salt selected from the group consisting of lithium perchlorate, lithium borate tetrafluoride and the like, in the above solvent.

The secondary cell produced using the cathode active material (III) of the present invention exhibits an initial discharge capacity of preferably about 130 to about 165 mAh/g, and a heat stability of preferably not less than 200° C., more preferably 205 to 250° C. when measured by the below-mentioned evaluation method.

The secondary cell produced using the cathode active material (III') of the present invention exhibits an initial discharge capacity of preferably about 130 to about 165 mAh/g, a heat stability of preferably not less than 215° C., more preferably 225 to 250° C. when measured by the below-mentioned evaluation method, and a capacity retention percentage after 50 cycles at 60° C. as high as not less than 95%, preferably 95 to 99%.

The point of the present invention is that the cathode active material produced using the cobalt oxide particles (I), (I') or (II) as a precursor thereof can show a high initial discharge capacity required for secondary cells, and is excellent in heat stability.

The reason why the cathode active material of the present invention can show a high initial discharge capacity, is considered as follow. That is, the cathode active material contains magnesium in such an amount as not to deteriorate the inherent initial discharge capacity of $LiCoO_2$.

Further, the reason why the cathode active material of the present invention can exhibit a large lattice constant, is considered by the present inventors as follows. That is, since magnesium is incorporated into the cobalt oxide particles (I), (I') or (II) at a stage of synthesis thereof, or the magnesium hydroxide is adhered onto the surface of the cobalt oxide particles, magnesium and cobalt are uniformly distributed in the cathode active material at atomic level. Therefore, it is suggested by the present inventors that the cobalt sites of the cathode active material obtained by using the cobalt oxide particles (I), (I') or (II) can be uniformly replaced with magnesium.

On the other hand, when the lithium compound, the cobalt compound and magnesium are dry-mixed with each other and then calcined by conventional methods, magnesium cannot be uniformly distributed in the cathode active material, thereby failing to obtain the effect of the present invention.

Also, the reason why the cathode active material of the present invention can exhibit an excellent heat stability, is considered as follows, though not clearly determined yet. That is, it is suggested that the crystal structure of the cathode active material can be stabilized by incorporating magnesium thereinto.

Further, the cathode active material of the present invention can exhibit a lower volume resistivity value and a higher electron conductivity as compared to conventional cathode active materials prepared by a dry method which have the same amount of magnesium. The reason therefor is not clearly determined yet, but is suggested to be that excess electrons are generated by replacing $Co^{3+}$ with $Mg^{2+}$ so that the electron conductivity becomes high and the volume resistivity value becomes low.

By using the cobalt oxide particles and the cathode active material according to the present invention, it becomes possible to obtain a non-aqueous electrolyte secondary cell capable of retaining a good initial discharge capacity required for secondary cells, and exhibiting an improved heat stability.

EXAMPLES

The present invention is described in more detail by Examples and Comparative Examples, but the Examples are only illustrative and, therefore, not intended to limit the scope of the present invention.

Various properties were evaluated by the following methods.

(1) The cathode active material was identified using a Powder X-ray Diffraction Analyzer (manufactured by Rigaku Denki Kogyo Co., Ltd.; Cu-Kα; 40 kV, 40 mA). Also, the lattice constant of the cathode active material was calculated from respective diffraction peaks of the powder X-ray diffraction curve.

(2) The crystallite size of the cathode active material was calculated from the respective diffraction peaks of the powder X-ray diffraction curve obtained above.

(3) The volume resistivity of the cathode active material was measured using a Wheatstone bridge-type 2768 insulation resistance meter (manufactured by Yokogawa Denki Co., Ltd.).

(4) The elemental analysis was conducted using an inductively coupled high-frequency plasma atomic emission spectroscope "SPS-4000 Model" (manufactured by Seiko Denshi Kogyo Co., Ltd.).

(5) The cell characteristics of the cathode active material were evaluated by testing a coin-shaped cell constituted from a cathode, an anode and an electrolyte solution prepared by the following methods.

<Preparation of Cathode>

The cathode active material, acetylene black as a conductive agent, and polyvinylidene fluoride as a binder were accurately weighed at a weight ratio of 85:10:5, and intimately mixed with each other in a mortar. The resultant mixture was dispersed in N-methyl-2-pyrrolidone to prepare a cathode slurry. Then, the thus obtained slurry was applied onto an aluminum foil as a current collector to form a coating film having a thickness of 150 μm, vacuum-dried at 150° C., and then punched into a disc shape having a diameter of 16 mm, thereby producing a cathode plate.

<Preparation of Anode>

A metallic lithium foil was punched into a disc shape having a diameter of 16 mm, thereby producing an anode.

<Preparation of Electrolyte Solution>

Lithium phosphate hexafluoride ($LiPF_6$) as an electrolyte was added in an amount of 1 mol/liter to a mixed solution containing ethylene carbonate and diethyl carbonate at a volume ratio of 50:50, thereby preparing an electrolyte solution.

<Assembling of Coin-shaped Cell>

In a globe box maintained under an argon atmosphere, the above cathode and anode were fitted via a polypropylene separator in a casing made of SUS316 stainless steel. Further, the electrolyte solution was filled in the casing, thereby producing a CR2032-type coin-shaped cell.

<Evaluation of Cell>

The above-produced coin-shaped cell was subjected to a charge/discharge cycle test for secondary cells. The charge and discharge cycles were repeated at a cathode current density of 0.2 mA/cm² while varying the cut-off voltage from 3.0 to 4.3 V to examine the change in discharge capacity.

<Evaluation of Heat Stability>

The above-produced coin-shaped cell was charged until the cell voltage reached 4.3 V. Then, the cathode active material was taken out from the cell, and filled in a container for thermal analysis, and then the container was sealed. The cathode active material filled in the container was subjected to DSC measurement using a differential scanning calorimeter "DSC6200" (manufactured by Seiko Instruments, Co., Ltd) at a temperature rise rate of 10° C./min. From the measurement results, the heat stability was expressed by the temperature at which heat generation was initiated. Meanwhile, the above evaluation procedure was conducted at a temperature of 30 to 400° C., and all works up to filling in the container were performed in the globe box having a dew point of −60° C. or lower.

Example 1

<Production of Cobalt Oxide Particles (I)>

Magnesium sulfate (5.3 mol % based on cobalt) was added to a solution containing cobalt in an amount of 0.5 mol/liter. In addition, an aqueous sodium hydroxide solution was added in an amount of 1.05 equivalents based on one equivalent of a neutralized part of a sum of cobalt and magnesium, to the resultant solution, thereby subjecting the solution to a neutralization reaction. Then, the obtained solution was subjected to oxidation reaction at 90° C. for 20 hours while passing air therethrough, thereby obtaining magnesium-containing cobalt oxide particles. It was confirmed that the thus obtained magnesium-containing cobalt oxide particles were composed of a $Co_3O_4$ single phase, and had a Mg content of 5.0 mol % (x in $(Co_{(1-x)}Mg_x)_3O_4$ is 0.05), an average particle diameter of 0.1 μm and a BET specific surface area value of 13.2 m²/g.

Example 2

<Production of Cathode Active Material>

The magnesium-containing cobalt oxide particles obtained in Example 1 were intimately mixed with a lithium compound such that the molar ratio of Li to a sum of cobalt and magnesium was 1.03. The resultant mixed particles were calcined at 90° C. for 10 hours under an oxidative atmosphere, thereby obtaining magnesium-containing lithium cobaltate particles.

As a result of the X-ray diffraction analysis of the thus obtained magnesium-containing lithium cobaltate particles, it was confirmed that the magnesium-containing lithium cobaltate particles were composed of a lithium cobaltate single phase without impurity phase, and had an average particle size of 5.0 μm, a BET specific surface area value of 0.5 m²/g, an a-axis length of lattice constant of 2.821 Å, a c-axis length of lattice constant of 14.082 Å, a crystallite size of 642 Å, a volume resistivity value of −2.1×10 Ωcm and an electron conductivity log (1/Ωcm) of −1.2. In addition, when the composition of the magnesium-containing lithium cobaltate particles was represented by the formula: $LiCo_{1-x}Mg_xO_2$, it was confirmed that the magnesium content x was 0.045.

The thus obtained magnesium-containing lithium cobaltate particles were used as a cathode active material to prepare a coin-shaped cell. As a result, it was confirmed that the thus prepared coin-shaped cell exhibited an initial discharge capacity of 147 mAh/g and a heat stability of 239° C.

Examples 3 to 9

The same procedure as defined in Example 1 was conducted except that the magnesium content was changed variously, thereby obtaining cobalt oxide particles.

Essential production conditions and various properties of the obtained cobalt oxide particles are shown in Table 1.

Examples 10 to 16

The same procedure as defined in Example 2 was conducted except that kind of cobalt oxide particles, mixing ratio of lithium and calcination temperature were changed variously, thereby obtaining cathode active materials and producing coin-shaped cells using the respective cathode active materials.

Essential production conditions are shown in Table 2, and various properties of the obtained cathode active materials and cell characteristics of the obtained coin-shaped cells are shown in Table 3.

Comparative Examples 1 to 6

In Comparative Example 1, cobalt oxide particles containing no magnesium were produced. In Comparative Example 3, lithium cobaltate particles containing no magnesium were produced. In Comparative Examples 4 to 6, the cobalt oxide particles obtained in Comparative Example 2 were dry-mixed with the magnesium raw material and the lithium raw material, and the resultant mixtures were calcined at the respective temperature, thereby obtaining lithium cobaltate particles containing magnesium.

Essential production conditions are shown in Table 2, and various properties of the obtained cathode active materials and cell characteristics of the obtained coin-shaped cells are shown in Table 3.

Example 17
<Production of Cobalt Oxide Particles (II)>

An aqueous sodium hydroxide solution was added in an amount of 1.05 equivalents based on one equivalent of a neutralized part of cobalt, to a solution containing cobalt in an amount of 0.5 mol/liter, thereby subjecting the resultant solution to a neutralization reaction. Then, the obtained solution was subjected to oxidation reaction at 90° C. for 20 hours while passing air therethrough, thereby obtaining cobalt oxide particles. Then, magnesium sulfate (1.0 mol % based on cobalt) was added to the resultant reaction solution containing the cobalt oxide particles, and further an aqueous sodium hydroxide solution was added in an amount required for neutralization of the magnesium salt, thereby treating the surface of the cobalt oxide particles with magnesium hydroxide. The pH value of the obtained reaction solution was 11. It was conformed that the thus obtained cobalt oxide particles surface-treated with magnesium hydroxide were composed of a $Co_3O_4$ single phase, and had a Mg content of 1.0 mol % (x in $(1-x)Co_3O_4 \cdot 3xMg(OH)_2$ is 0.01), an average particle diameter of 0.1 μm and a BET specific surface area value of 13.5 m²/g.

Example 18
<Production of Cathode Active Material>

The cobalt oxide particles surface-treated with magnesium hydroxide which were obtained in Example 17, were intimately mixed with a lithium compound such that the molar ratio of Li to a sum of cobalt and magnesium was 1.03. The resultant mixed particles were calcined at 900° C. for 10 hours under an oxidative atmosphere, thereby obtaining magnesium-containing lithium cobaltate particles.

As a result of the X-ray diffraction analysis of the thus obtained magnesium-containing lithium cobaltate particles, it was confirmed that the magnesium-containing lithium cobaltate particles were composed of a lithium cobaltate single phase without impurity phase, and had an average particle diameter of 4.7 μm, a BET specific surface area value of 0.5 m²/g, an a-axis length of lattice constant of 2.817 Å, a c-axis length of lattice constant of 14.065 Å, a crystallite size of 631 Å, a volume resistivity value of $7.1 \times 10^4$ Ωcm and an electron conductivity log (1/Ωcm) of −4.9. In addition, when the composition of the magnesium-containing lithium cobaltate particles was represented by the formula: $LiCo_{1-x}Mn_xO_2$, it was confirmed that the magnesium content x was 0.01.

The thus obtained magnesium-containing lithium cobaltate particles were used as a cathode active material to prepare a coin-shaped cell. As a result, it was confirmed that the thus prepared coin-shaped cell exhibited an initial discharge capacity of 161 mAh/g and a heat stability of 216° C.

Examples 19 to 21 and Comparative Example 7

The same procedure as defined in Example 17 was conducted except that the amount of magnesium added for the surface treatment with magnesium hydroxide was changed variously, thereby obtaining cobalt oxide particles surface-treated with magnesium hydroxide.

Essential production conditions and various properties of the obtained cobalt oxide particles surface-treated with magnesium hydroxide are shown in Table 4.

Examples 22 to 24 and Comparative Example 8

The same procedure as defined in Example 18 was conducted except that kind of cobalt oxide particles and mixing ratio of lithium were changed variously, thereby obtaining cathode active materials and producing coin-shaped cells using the cathode active materials.

Essential production conditions are shown in Table 5, and various properties of the obtained cathode active materials and cell characteristics of the obtained coin-shaped cells are shown in Table 6.

Thus, it was confirmed that the coin-shaped cells produced using the cathode active materials of the present invention exhibited an initial discharge capacity of 130 to 160 mAh/g and a heat stability as high as not less than 200° C.

On the contrary, as apparent from the results of Comparative Examples, when the magnesium content x is more than 0.2, the initial discharge capacity was considerably lowered. Further, when the respective elements were mixed with each other by a dry method, the effect of improving the heat stability based on the amount of magnesium added was deteriorated.

Example 25
<Production of Cobalt Oxide Particles (I')>

Magnesium sulfate (1.0 mol % based on cobalt) was added to a solution containing cobalt in an amount of 0.5 mol/liter. Further, an aqueous sodium hydroxide solution was added in an amount of 1.05 equivalents based on one equivalent of a neutralized part of a sum of cobalt and magnesium, to the resultant solution, thereby subjecting the solution to a neutralization reaction. Then, the obtained solution was subjected to oxidation reaction at 90° C. for 20 hours while passing air therethrough, thereby obtaining magnesium-containing cobalt oxide particles. Successively, aluminum sulfate (1.0 mol % based on cobalt) was added to the reaction solution containing the thus obtained magnesium-containing cobalt oxide particles, and further an aqueous sodium hydroxide solution was added in an amount requiring for neutralizing the aluminum sulfate to the solution, thereby treating the surface of the respective magnesium-containing cobalt oxide particles with aluminum hydroxide. The pH value of the reaction solution treated was 9. It was conformed that the thus obtained magnesium-containing cobalt oxide particles surface-treated with aluminum hydroxide were composed of a $Co_3O_4$ single phase, and had a Mg content of 1.0 mol % and an aluminum content of 1.0 mol % (x and y of $(Co_{(1-x)}Mg_x)_3O_4 \cdot 3yAl(OH)_3$ are both 0.01), an average particle diameter of 0.1 μm and a BET specific surface area value of 13.4 m$^2$/g.

Example 26
<Production of Cathode Active Material (III')>

The magnesium-containing cobalt oxide particles surface-treated with aluminum hydroxide obtained in Example 25 were intimately mixed with a lithium compound such that the molar ratio of Li to a sum of cobalt, magnesium and aluminum was 1.03. The resultant mixed particles were calcined at 900° C. for 10 hours under an oxygen atmosphere, thereby obtaining lithium cobaltate particles containing magnesium and aluminum.

As a result of the X-ray diffraction analysis of the thus obtained lithium cobaltate particles containing magnesium and aluminum, it was confirmed that the lithium cobaltate particles were composed of a lithium cobaltate single phase without impurity phase, and had an average particle diameter of 4.9 μm, a BET specific surface area value of 0.5 m$^2$/g, an a-axis length of lattice constant of 2.817 Å, a c-axis length of lattice constant of 14.068 Å, a crystallite size of 652 Å, a volume resistivity value of $7.1 \times 10^4$ Ωcm and an electron conductivity log (1/Ωcm) of −4.9. In addition, as to the magnesium and aluminum contents, when the composition of the lithium cobaltate particles containing magnesium and aluminum was represented by the formula: $LiCo_{(1-x-y)}Mg_xAl_yO_2$, it was confirmed that the magnesium content x was 0.01 and the aluminum content y was 0.01.

The thus obtained lithium cobaltate particles containing magnesium and aluminum were used as a cathode active material to prepare a coin-shaped cell. As a result, it was confirmed that the thus prepared coin-shaped cell exhibited an initial discharge capacity of 158 mAh/g, a capacity retention percentage of 98% after 100 cycles at 60° C., and a heat stability of 219° C.

Example 27
<Production of Cobalt Oxide Particles (I)>

Magnesium sulfate (1.0 mol % based on cobalt) was added to a solution containing cobalt in an amount of 0.5 mol/liter. Further, an aqueous sodium hydroxide solution was added in an amount of 1.05 equivalents based on one equivalent of a neutralized part of a sum of cobalt and magnesium, to the resultant solution, thereby subjecting the solution to a neutralization reaction. Then, the obtained solution was subjected to oxidation reaction at 90° C. for 20 hours while passing air therethrough, thereby obtaining magnesium-containing cobalt oxide particles. It was conformed that the thus obtained magnesium-containing cobalt oxide particles were composed of a $Co_3O_4$ single phase, and had a Mg content of 1.0 mol % (x of $(Co_{(1-x)}Mg_x)_3O_4$ is 0.01), an average particle diameter of 0.1 μm and a BET specific surface area value of 13.0 m$^2$/g.

Example 28
<Production of Cathode Active Material (III')>

The magnesium-containing cobalt oxide particles obtained in Example 27 were intimately mixed with an aluminum compound and a lithium compound such that the molar ratio of Li and Al to a sum of cobalt, magnesium and aluminum was 1.03 and 0.01, respectively. The resultant mixed particles were calcined at 900° C. for 10 hours under an oxidative atmosphere, thereby obtaining lithium cobaltate particles containing magnesium and aluminum.

As a result of the X-ray diffraction analysis of the thus obtained lithium cobaltate particles containing magnesium and aluminum, it was confirmed that the lithium cobaltate particles were composed of a lithium cobaltate single phase without impurity phase, and had an average particle diameter of 4.8 μm, a BET specific surface area value of 0.5 m$^2$/g, an a-axis length of lattice constant of 2.817 Å, a c-axis length of lattice constant of 14.068 Å, a crystallite size of 645 Å, a volume resistivity value of $7.0 \times 10$ Ωcm and an electron conductivity log (1/Ωcm) of −4.8. In addition, as to the magnesium and aluminum contents, when the composition of the lithium cobaltate particles containing magnesium and aluminum was represented by the formula: $LiCo_{(1-x-y)}Mg_xAl_yO_2$, it was confirmed that the magnesium content x was 0.01 and the aluminum content y was 0.01.

The thus obtained lithium cobaltate particles containing magnesium and aluminum were used as a cathode active material to prepare a coin-shaped cell. As a result, it was confirmed that the thus prepared coin-shaped cell exhibited an initial discharge capacity of 158 mAh/g, a capacity retention percentage of 98% after 100 cycles at 60° C., and a heat stability of 220° C.

Example 29
<Production of Cobalt Oxide Particles (I)>

An aqueous sodium hydroxide solution was added in an amount of 1.05 equivalents based on one equivalent of a neutralized part of cobalt to a solution containing cobalt in an amount of 0.5 mol/liter, thereby subjecting the mixed solution to a neutralization reaction. Then, the obtained solution was subjected to oxidation reaction at 90° C. for 20 hours while passing air therethrough, thereby obtaining cobalt oxide particles. Successively, magnesium sulfate (1.0 mol % based on cobalt) was added to the reaction solution containing the thus obtained cobalt oxide particles, and further an aqueous sodium hydroxide solution was added in an amount requiring for neutralizing the magnesium sulfate to the solution, thereby treating the surface of the respective cobalt oxide particles with magnesium hydroxide. The pH value of the reaction solution treated was 11. It was conformed that the thus obtained cobalt oxide particles surface-treated with magnesium hydroxide were composed of a $Co_3O_4$ single phase, and had a Mg content of 1.0 mol % (x of $((1-x)Co_3O_4 \cdot 3xMg(OH)_2$ is 0.01), an average particle diameter of 0.1 μm and a BET specific surface area value of 13.5 m$^2$/g.

Example 30
<Production of Cathode Active Material (III')>

The cobalt oxide particles surface-treated with magnesium hydroxide obtained in Example 29 were intimately mixed with an aluminum compound and a lithium compound such that the molar ratio of Li and Al to a sum of cobalt, magnesium and aluminum was 1.03 and 0.01, respectively. The resultant mixed particles were calcined at 900° C. for 10 hours under an oxidative atmosphere, thereby obtaining lithium cobaltate particles containing magnesium and aluminum.

As a result of the X-ray diffraction analysis of the thus obtained lithium cobaltate particles containing magnesium and aluminum, it was confirmed that the lithium cobaltate particles were composed of a lithium cobaltate single phase without impurity phase, and had an average particle diameter of 4.8 $\mu$m, a BET specific surface area value of 0.5 m$^2$/g, an a-axis length of lattice constant of 2.817 Å, a c-axis length of lattice constant of 14.066 Å, a crystallite size of 650 Å, a volume resistivity value of 7.1×10$^4$ Ωcm and an electron conductivity log (1/Ωcm) of −4.9. In addition, as to the magnesium and aluminum contents, when the composition of the lithium cobaltate particles containing magnesium and aluminum was represented by the formula: LiCo$_{(1-X-Y)}$Mg$_x$Al$_y$O$_2$, it was confirmed that the magnesium content x was 0.01 and the aluminum content y was 0.01.

The thus obtained lithium cobaltate particles containing magnesium and aluminum were used as a cathode active material to prepare a coin-shaped cell. As a result, it was confirmed that the thus prepared coin-shaped cell exhibited an initial discharge capacity of 158 mAh/g, a capacity retention percentage of 98% after 100 cycles at 60° C., and a heat stability of 218° C.

TABLE 1

| Examples and Comparative Examples | Production conditions of cobalt oxide | | | | | Properties of cobalt oxide | | |
|---|---|---|---|---|---|---|---|---|
| | Amount of Mg added (Mg/Co) (mol %) | Kind of aqueous alkali solution | Amount of alkali added (equivalent ratio) | Oxidation reaction temperature (° C.) | Oxidation reaction time (hr) | Mg content (mol %) | Average particle diameter ($\mu$m) | BET specific surface area (m$^2$/g) |
| Example 1 | 5.3 | NaOH | 1.05 | 90 | 20 | 5.0 | 0.1 | 13.2 |
| Example 3 | 1.0 | NaOH | 1.05 | 90 | 20 | 1.0 | 0.1 | 13.6 |
| Example 4 | 3.1 | NaOH | 1.05 | 90 | 20 | 3.0 | 0.1 | 13.1 |
| Example 5 | 6.5 | NaOH | 1.05 | 90 | 20 | 6.0 | 0.1 | 13.6 |
| Example 6 | 8.7 | NaOH | 1.05 | 90 | 20 | 8.0 | 0.1 | 13.3 |
| Example 7 | 9.9 | NaOH | 1.05 | 90 | 20 | 9.0 | 0.1 | 13.9 |
| Example 8 | 6.5 | NaOH | 1.05 | 90 | 20 | 6.0 | 0.1 | 13.4 |
| Example 9 | 6.5 | NaOH | 1.05 | 90 | 20 | 6.0 | 0.1 | 13.6 |
| Comparative Example 1 | 0 | NaOH | 1.05 | 90 | 20 | 0.0 | 0.1 | 13.0 |
| Comparative Example 2 | — | — | — | — | — | — | 1.0 | 1.3 |

TABLE 2

| Examples and Comparative Examples | Kind of cobalt oxide particles used | Production conditions of lithium cobaltate | | | |
|---|---|---|---|---|---|
| | | Mixing ratio between cobalt oxide particles and magnesium salt (molar ratio of Mg to Co) | Li/(Co + Mg) (molar ratio) | Calcination temperature (° C.) | Calcination time (hr) |
| Example 2 | Example 1 | contained in cobalt oxide particles | 1.03 | 900 | 10 |
| Example 10 | Example 3 | contained in cobalt oxide particles | 1.02 | 900 | 10 |
| Example 11 | Example 4 | contained in cobalt oxide particles | 1.02 | 900 | 10 |
| Example 12 | Example 5 | contained in cobalt oxide particles | 1.02 | 900 | 10 |
| Example 13 | Example 6 | contained in cobalt oxide particles | 1.02 | 900 | 10 |
| Example 14 | Example 7 | contained in cobalt oxide particles | 1.02 | 900 | 10 |
| Example 15 | Example 8 | contained in cobalt oxide particles | 1.02 | 800 | 10 |
| Example 16 | Example 9 | contained in cobalt oxide particles | 1.03 | 900 | 10 |
| Comparative Example 3 | Comparative Example 1 | 0 | 1.02 | 900 | 10 |
| Comparative Example 4 | Comparative Example 2 | 0.02 | 1.02 | 900 | 10 |
| Comparative Example 5 | Comparative Example 2 | 0.03 | 1.02 | 900 | 10 |
| Comparative Example 6 | Comparative Example 2 | 0.05 | 1.02 | 900 | 10 |

TABLE 3

| Examples and Comparative Examples | Properties of cathode active material | | | | | | | | Cell characteristics | |
|---|---|---|---|---|---|---|---|---|---|---|
| | Mg content (x) | Particle size (μm) | BET specific surface area (m²/g) | X-ray measurement | Lattice constant | | Volume resistivity (Ωcm) | Electron conductivity log (1/Ωcm) | Initial discharge capacity (mAh/g) | Heat stability (° C.) |
| | | | | | a-axis (Å) | c-axis (Å) | | | | |
| Example 2 | 0.05 | 5.0 | 0.5 | Single phase | 2.821 | 14.082 | 2.1 × 10 | −1.2 | 147 | 239 |
| Example 10 | 0.01 | 4.7 | 0.5 | Single phase | 2.817 | 14.065 | 5.6 × 10⁴ | −4.6 | 161 | 216 |
| Example 11 | 0.03 | 4.9 | 0.5 | Single phase | 2.820 | 14.072 | 1.2 × 10² | −2 | 155 | 225 |
| Example 12 | 0.06 | 5.0 | 0.5 | Single phase | 2.823 | 14.083 | 2.0 × 10 | −1.2 | 147 | 239 |
| Example 13 | 0.08 | 6.3 | 0.5 | Single phase | 2.824 | 14.090 | 1.5 × 10 | −1.1 | 135 | 240 |
| Example 14 | 0.09 | 6.9 | 0.4 | Single phase | 2.825 | 14.095 | 1.1 × 10 | −0.9 | 130 | 241 |
| Example 15 | 0.06 | 3.9 | 0.6 | Single phase | 2.821 | 14.081 | 3.7 × 10 | −1.6 | 147 | 239 |
| Example 16 | 0.06 | 6.2 | 0.5 | Single phase | 2.823 | 14.087 | 2.6 × 10 | −1.3 | 147 | 239 |
| Comparative Example 3 | 0 | 4.7 | 0.5 | Single phase | 2.816 | 14.053 | 1.2 × 10⁵ | −5.1 | 158 | 181 |
| Comparative Example 4 | 0.02 | 7.7 | 0.4 | Single phase | 2.815 | 14.053 | 4.2 × 10⁵ | −5.6 | 148.9 | 182 |
| Comparative Example 5 | 0.03 | 8.1 | 0.4 | Single phase | 2.816 | 14.057 | 8.5 × 10⁴ | −4.9 | 147.2 | 185 |
| Comparative Example 6 | 0.05 | 8.3 | 0.4 | Single phase | 2.817 | 14.067 | 3.8 × 10³ | −3.6 | 141 | 186 |

TABLE 4

| Examples and Comparative Examples | Production conditions of cobalt oxide | | | | | Properties of cobalt oxide | | |
|---|---|---|---|---|---|---|---|---|
| | Kind of aqueous alkali solution | Amount of alkali added (equivalent ratio) | Oxidation reaction temperature (° C.) | Oxidation reaction time (hr) | Amount of Mg added (Mg/Co) (mol %) | Mg content (mol %) | Average particle diameter (μm) | BET specific surface area (m²/g) |
| Example 17 | NaOH | 1.05 | 90 | 20 | 1.0 | 1 | 0.1 | 13.5 |
| Example 19 | NaOH | 1.05 | 90 | 20 | 3.1 | 3 | 0.1 | 13.6 |
| Example 20 | NaOH | 1.05 | 90 | 20 | 6.5 | 6 | 0.1 | 14.4 |
| Example 21 | NaOH | 1.05 | 90 | 20 | 8.7 | 8 | 0.1 | 15.2 |
| Comparative Example 7 | NaOH | 1.05 | 90 | 20 | 25 | 20 | 0.1 | 18.0 |

TABLE 5

| Examples and Comparative Examples | Kind of cobalt oxide particles used | Production conditions of lithium cobaltate | | |
|---|---|---|---|---|
| | | Li/(Co + Mg) (molar ratio) | Calcination temperature (° C.) | Calcination time (hr) |
| Example 18 | Example 17 | 1.03 | 900 | 10 |
| Example 22 | Example 19 | 1.02 | 900 | 10 |
| Example 23 | Example 20 | 1.02 | 900 | 10 |
| Example 24 | Example 21 | 1.02 | 900 | 10 |
| Comparative Example 8 | Comparative Example 7 | 1.02 | 900 | 10 |

TABLE 6

| Examples and Comparative Examples | Properties of cathode active material | | | | | | | | Cell characteristics | |
|---|---|---|---|---|---|---|---|---|---|---|
| | Mg content (x) | Particle size (μm) | BET specific surface area (m²/g) | X-ray measurement | Lattice constant | | Volume resistivity (Ωcm) | Electron conductivity log (1/Ωcm) | Initial discharge capacity (mAh/g) | Heat stability (° C.) |
| | | | | | a-axis (Å) | c-axis (Å) | | | | |
| Example 18 | 0.01 | 4.7 | 0.5 | Single phase | 2.817 | 14.065 | 7.1 × 10⁴ | −4.9 | 161 | 216 |
| Example 22 | 0.03 | 5.0 | 0.5 | Single phase | 2.820 | 14.072 | 1.8 × 10² | −2.3 | 155 | 225 |

TABLE 6-continued

| Examples and Comparative Examples | Properties of cathode active material | | | | | | | | Cell characteristics | |
|---|---|---|---|---|---|---|---|---|---|---|
| | Mg content (x) | Particle size (μm) | BET specific surface area (m²/g) | X-ray measurement | Lattice constant | | Volume resistivity (Ωcm) | Electron conductivity log (1/Ωcm) | Initial discharge capacity (mAh/g) | Heat stability (° C.) |
| | | | | | a-axis (Å) | c-axis (Å) | | | | |
| Example 23 | 0.06 | 5.2 | 0.5 | Single phase | 2.823 | 14.083 | 2.1 × 10 | −1.3 | 147 | 239 |
| Example 24 | 0.08 | 6.1 | 0.5 | Single phase | 2.824 | 14.090 | 1.5 × 10 | −1.2 | 135 | 240 |
| Comparative Example 8 | 0.2 | 7.1 | 0.4 | Single phase | 2.834 | 14.140 | 9.0 | −1.0 | 112 | 240 |

What is claimed is:

1. A cathode active material for a non-aqueous electrolyte secondary cell, having a composition represented by the formula:

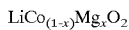

LiCo$_{(1-x)}$Mg$_x$O$_2$ wherein x is 0.001 to 0.15, having an average particle diameter of 1.0 to 20 μm, a BET specific surface area value of 0.1 to 1.6 m²/g, a volume resistivity value of 1.0×10 to 1.0×10⁶ Ω·cm, an electron conductivity (log (1/Ωcm) of −0.5 to −5.0 and a crystallite size of 400 to 1,200 Å, and having an a-axis length of lattice constant of from 0.090x+2.816 Å to 0.096x+2.821 Å and a c-axis length of lattice constant of 0.460x+14.053 Å to 0.476x+14.063 Å wherein x has the same meaning as defined above.

2. A cathode active material according to claim 1, wherein the magnesium content x is 0.01 to 0.10 and the average particle diameter is 2.0 to 10 μm.

3. A process for producing the cathode active material for a non-aqueous electrode secondary cell defined in claim 1, comprising:

mixing a lithium compound and cobalt oxide particles having a composition represented by the formula:

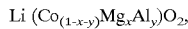

(Co$_{(1-x)}$Mg$_x$)$_3$O$_4$ wherein x is 0.001 to 0.15, and having a BET specific surface area value of 0.5 to 50 m²/g and an average particle diameter of not more than 0.2 μm; and heat-treating the resultant mixture.

4. A process according to claim 3, wherein a mixing molar ratio of lithium to a sum of cobalt and magnesium in the cobalt oxide particles is 0.95 to 1.05; and the heat-treating temperature is 600 to 950° C.

5. A non-aqueous electrolyte secondary cell having a cathode comprising a cathode active material having a composition represented by the formula:

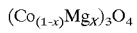

LiCo$_{(1-x)}$Mg$_x$O$_2$ wherein x is 0.001 to 0.15.

having an average particle diameter of 1.0 to 20 μm, a BET specific surface area value of 0.1 to 1.6 m²/g, a volume resistivity value of 1.0×10 to 1.0×10⁶ Ωcm, an electron conductivity (log (1/Ωcm) of −0.5 to −5.0 and a crystallite size of 400 to 1,200 Å, and having an a-axis length of lattice constant of from 0.090x+2.816 Å to 0.096x+2.821 Å and a c-axis length of lattice constant of 0.460x+14.053 Å to 0.476x+14.063 Å wherein x has the saute meaning as defined above.

6. A cathode active material for a non-aqueous electrolyte secondary cell, having a composition represented by the formula:

Li (Co$_{(1-x-y)}$Mg$_x$Al$_y$)O$_2$, wherein x is 0.001 to 0.15 and y is 0.001 to 0.05 having an average particle diameter of 1.0 to 20 μm, a BET specific surface area value of 0.1 to 1.6 m²/g, a volume resistivity value of 1.0×10 to 1.0×10⁶ cm, an electron conductivity (log (1/Ωcm) of −0.5 to −5.0 and a crystallite size of 400 to 1,200 Å, and having an a-axis length of lattice constant of from 0.090x+2.816 Å to 0.096x+2.821 Å and a c-axis length of lattice constant of 0.460x+14.053 Å to 0.476x+14.063 Å wherein x has the same meaning as defined above.

7. A cathode active material according to claim 6, wherein the magnesium content x is 0.01 to 0.10 and the average particle diameter is 2.0 to 10 μm.

8. A process according to claim 7, wherein a mixing molar ratio of lithium to a sum of cobalt and magnesium in the cobalt oxide particles is 0.95 to 1.05; and the heat-treating temperature is 600 to 950° C.

9. A non-aqueous electrolyte secondary cell having a cathode comprising the cathode active material defined in claim 6.

10. A process for producing the cathode active material for a non-aqueous electrode secondary cell defined in claim 6, comprising:

mixing a lithium compound and cobalt oxide particles having have a composition represented by the formula:

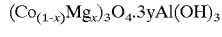

(Co$_{(1-x)}$Mg$_x$)$_3$O$_4$·3yAl(OH)$_3$ wherein x is 0.001 to 0.15 and y is 0.001 to 0.05, and having a BET specific surface area value of 0.5 to 50 m²/g and an average particle diameter of not more than 0.2 μm; and heat-treating the resultant mixture.

* * * * *